United States Patent [19]

Steeby et al.

[11] Patent Number: 5,044,216
[45] Date of Patent: Sep. 3, 1991

[54] TRANSMISSION SHIFT CONTROL

[75] Inventors: Jon A. Steeby, Schoolcraft; Alan R. Davis, Plainwell, both of Mich.

[73] Assignee: Eaton Corporation, Cleveland, Ohio

[21] Appl. No.: 574,868

[22] Filed: Aug. 30, 1990

[51] Int. Cl.$^5$ .............................................. B60K 20/14
[52] U.S. Cl. ..................................... 74/335; 192/114 T
[58] Field of Search ............... 74/335, 471 XY, 336 R, 74/475; 192/114 T

[56] References Cited

U.S. PATENT DOCUMENTS

| | | | |
|---|---|---|---|
| 3,367,462 | 2/1968 | Bibbens | 192/55 |
| 4,046,032 | 9/1977 | Braun et al. | 74/865 |
| 4,290,515 | 9/1981 | Bogema et al. | 192/53 |
| 4,445,393 | 5/1984 | Braun | 74/346 |
| 4,748,863 | 6/1988 | McNinch et al. | 74/335 |
| 4,873,881 | 10/1989 | Edelen et al. | 74/336 |
| 4,928,544 | 5/1990 | Markyvech et al. | 74/335 |
| 4,957,016 | 9/1990 | Amedei et al. | 74/335 X |

Primary Examiner—Allan D. Herrmann
Assistant Examiner—William O. Trousdell
Attorney, Agent, or Firm—H. D. Gordon

[57] ABSTRACT

An improved electrically controlled, fluid pressure actuated transmission control system (100) is provided. The improved control system includes an anti-default valve (102), preferably a normally closed solenoid controlled valve, fluidly interposed between the system source of pressurized fluid and the various pressurized and/or exhausted chambers of the system piston/cylinder actuator assembly (16).

8 Claims, 3 Drawing Sheets

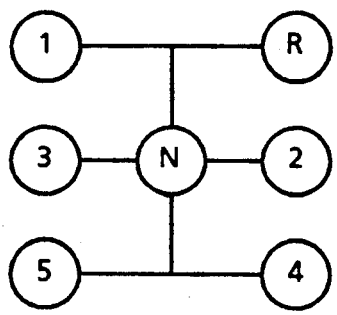
PRIOR ART
FIG. 2
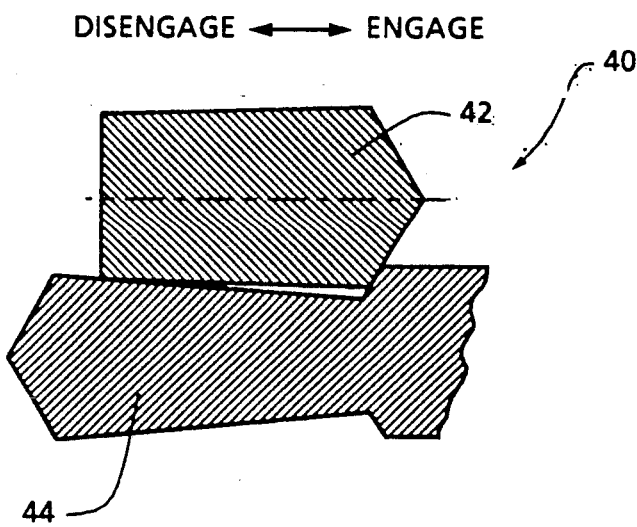
PRIOR ART
FIG. 3
| SOLENOID CONDITION ("+" = ON, "−" = OFF) | | | | X-X ACTUATOR | Y-Y ACTUATOR |
|---|---|---|---|---|---|
| 1 | 2 | 3 | 4 | | |
| − | − | | | 3-2 | |
| + | − | | | 1-R | |
| + | + | | | 1-R | |
| − | + | | | 5-4 | |
| | | − | − | | N |
| | | + | − | | F |
| | | + | + | | F |
| | | − | + | | A |
FIG. 5

TRANSMISSION SHIFT CONTROL

BACKGROUND OF THE INVENTION

1. Field of the Invention

The present invention relates to an electrically controlled, pressurized fluid powered transmission shift control system. In particular, the present invention relates to an electrically controlled, fluid actuated shift control systems of the type having at least one multiple position actuator selectively positioned by one or more electrically controlled two position valves having either a normally open or normally closed condition, one position of said actuator corresponding to all of said valves being in the normal positions thereof. More particularly, the present invention relates to an electrically controlled fluid pressure actuated shift control system having a mechanism for retaining the actuator in the selecting position thereof in the event of an interruption or failure of the source of electrical power or of pressurized fluid.

2. Description of the Invention

Automatic or semi-automatic change gear transmissions including fluid power actuators controlled by electrical command output signals from a system controller, usually a microprocessor based ECU, are well known in the prior art as may be seen by reference to U.S. Pat. Nos. 4,361,060; 4,648,290; 4,595,986; 4,873,881; and 4,722,248, the disclosures of which are hereby incorporated by reference.

Fluid pressure actuated, electrically controlled transmission shift actuators, of both the multiple parallel piston type and the X-Y shifter type are well known in the prior art as may be seen by reference to U.S. Pat. Nos. 4,928,544; 4,748,863; 4,445,393 and 4,046,032, the disclosures of which are hereby incorporated by reference.

Typically, such prior art control systems comprised a plurality of two, three or four position actuators having a plurality of complimentary and/or opposed pistons, often differential area pistons, the pressurization or exhausting of which pistons being controlled by a plurality of electrically controlled, usually solenoid controlled, two position valves biased to a normally open or a normally closed condition and, upon energization of the solenoid, displaceable to the other position thereof.

While the prior art electrically controlled, pressurized fluid powered shift actuators for drive train components, such as change gear transmissions, were well received, they were not totally satisfactory as, in the event of an interruption or failure in the electrical power supply, the valves will revert to the normally open or normally closed positions thereof and the actuator will be caused; possibly undesirably, to assume the default position thereof, often a neutral or disengaged position. Assuming such a default position may be undesired as the vehicle may lose the limp home/limp off road possibility and/or engine braking may be lost.

SUMMARY OF THE INVENTION

In accordance with the present invention, the drawbacks of the prior art have been minimized or overcome by the provision of an electrically controlled, pressurized fluid actuated shifting mechanism which will not undesirably shift from a selected position to a default position upon the interruption or loss of system electric power.

The above is accomplished by utilizing an additional electrically controlled normally closed two position valve interposed between the source of pressurized fluid and the actuator mechanism. In one preferred embodiment, the additional valve is only opened during the shift transients and the actuator, and shift forks positioned thereby, are maintained in a selected engaged position by means of back-tapered jaw clutch teeth and/or resilient detent devices. In another embodiment, the added valve is maintained open while electric power is uninterrupted and fluid power, detents and/or back-tapered clutch teeth retain the actuator in its selected position in the absence of an interruption in system electrical power.

Accordingly, it may be seen that a new and improved electrically controlled, pressurized fluid actuated shift control system is provided.

This and other objects and advantages of the present invention will become apparent from a reading of the detailed description of the preferred embodiment taken in connection with the attached drawings.

BRIEF DESCRIPTION OF THE DRAWINGS

FIG. 2 is a schematic illustration of the shift pattern for a mechanical change gear transmission of the type to be controlled by the control system of FIG. 1.

FIG. 3 is an enlarged partial view in section illustrating typical prior art back-tapered jaw clutch tooth structure.

FIG. 5 is a chart illustrating the selected positions assumed by the X-Y shift actuator of FIGS. 1 and 4 for various states of energization of the solenoid control valves.

DETAILED DESCRIPTION OF THE PREFERRED EMBODIMENT

Figure 4:
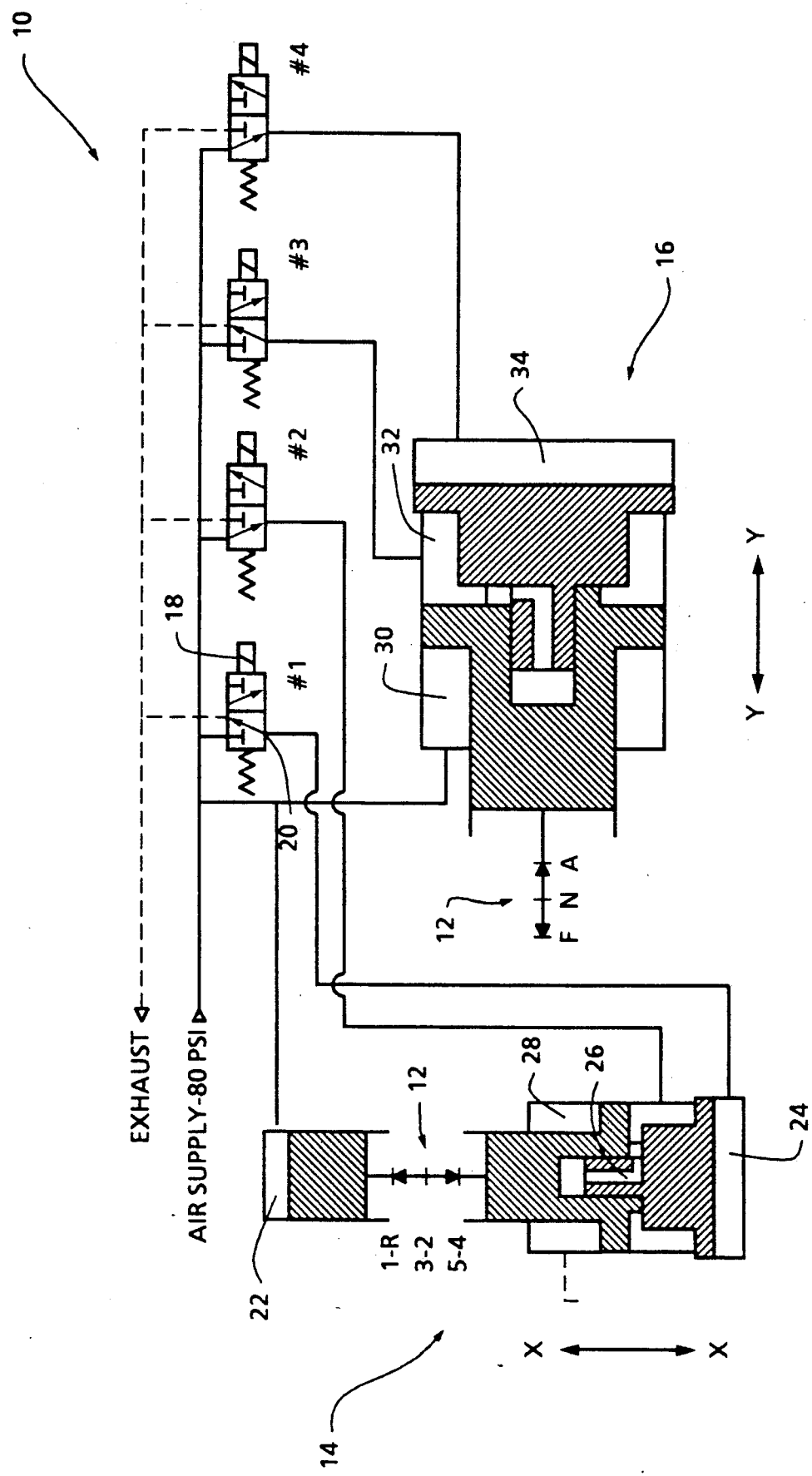
FIG. 4 is a schematic illustration of a prior art mechanical transmission shift control system.

A schematic illustration of a prior art electrically controlled, pressurized fluid actuated transmission shift control system 10 of the so-called "X-Y" type may be seen by reference to FIG. 4. This and other types of "X-Y" shifting mechanisms are well known in the prior art as may be seen by reference to the above-mentioned U.S. Pat. Nos. 4,928,854; 4,748,863 and 4,873,881.

In the X-Y shift control system 10 illustrated in FIG. 4, the shift finger 12 may be positioned in one of three selectable positions in the X-X axial direction for selection of the first and reverse speed rail (1-R), the third and second speed rail (3-2), or the fifth and fourth speed rail (4-5) by means of a piston/cylinder assembly 14. The shift finger may be selectably positioned in the Y-Y or engaged/disengaged position to a forward (F), neutral (N) or aft (A) position by means of a slightly larger piston/cylinder assembly 16.

Normally closed solenoid controlled valve 1 and normally opened solenoid controlled valve 2 are utilized to control the piston/cylinder assembly 14 for selection of an appropriate shift rail while normally closed solenoid controlled valve 3 and normally opened solenoid controlled valve 4 are utilized to control the forward neutral or aft positioning of the engagement controlling cylinder/piston assembly 16. As is well known, each of the solenoid controlled valves includes an electrical solenoid 18 which may be individually actuated from a common power source, the vehicle electrical system, to displace the valve associated therewith from its normally assumed position By way of example, the solenoid 18 associated with solenoid controlled valve 1 may be electrically actuated to displace solenoid controlled valve 1 from its normally closed to a displaced opened position. In the open position of the solenoid controlled three way-two position valves, the outlet ports 20 thereof are connected to the source of pressurized fluid while in the closed positions thereof the outlet port is connected to an exhaust to atmosphere and disconnected from the source of pressurized fluid.

In the illustrated control system 10, the source of pressurized fluid is pressurized air which is preferably cleaned and regulated to about eighty psi. It is understood, however, that control system 10 is equally applicable, with suitable modifications, to be utilized with pressurized liquids such as hydraulic fluids or the like. Similarly, while electrical control of the valves is typical, other control mediums, such as fluidic and hydraulic controls are equally applicable.

Briefly, piston/cylinder assembly 14 includes a first chamber 22 constantly exposed to the source of pressurized fluid, a second, larger chamber 24 fluidly connected to the outlet port of normally closed solenoid controlled valve 1 and a third chamber 26 fluidly connected to the outlet port of normally opened solenoid controlled valve 2. A fourth chamber 28 is connected to a source of exhaust to prevent binding of the piston/cylinder assembly.

The in-gear Y-Y piston-cylinder assembly 16 includes a first chamber 30 constantly exposed to the source of pressurized fluid, a second chamber 32 fluidly connected to the outlet of normally closed solenoid controlled valve 3 and a third chamber 34 fluidly connected to the outlet of normally open solenoid controlled valve 4.

FIG. 5 is a chart, in the form of a "truth table", illustrating the conditions of the various solenoids required to select particular positions of actuator 10 in the X—X and Y-Y positions. If both solenoids 1 and 2 are not actuated, finger 12 will select the third and second speed rail (3-2). If solenoid 1 is actuated to open the normally closed solenoid controlled valve 1, regardless of the energization of solenoid 2, the first and reverse speed rail (1-R) will be selected by shift finger 12. If solenoid 1 is not actuated and solenoid 2 is actuated to close the normally open solenoid controlled valve 2, the shift finger 12 will select the fifth-fourth speed shift rail (5-4). If the third and fourth solenoids are not actuated the shift finger will remain in the neutral (N) position in the Y-Y axial direction. If solenoid 3 is actuated, opening the normally closed solenoid controlled valve 3, the shift finger 12 will move to the forward (F) position regardless of the state of energization of solenoid 4. If solenoid 3 remains inactive and solenoid 4 is actuated to close the normally opened solenoid controlled valve 4, the shift finger 12 will move to the aft (A) position.

Upon selection of a desired actuator position, the solenoid controlled valves are retained in the selected actuated or nonactuated conditions thereof so that continuing fluid pressure will maintain the actuator in the selected position.

In the event of a interruption or failure of the supply of electrical power to the solenoids 18, all of the solenoid controlled valves will revert to the normally assumed positions thereof which will result in shifting of the actuator to the neutral (N) position of shift finger 12 causing disengagement of the currently engaged gear ratio. Accordingly, neutral, with the shift finger aligned with the third-second speed shift rail, is the default position of actuator 10. Sudden, unexpected, undesired shifting of the actuator 10 to the default position thereof may be highly undesirable as it may result in a loss of power to the vehicle drive wheels, the vehicle losing engine braking and/or preventing the vehicle from limping to the side of the road or limping home.

In the event of a loss of fluid pressure, the actuator 10 will remain in its existing condition unless vehicle vibration or the natural tendency of jaw clutches to disengage causes the actuator to be forced back to the neutral position thereof. This tendency to naturally disengage may be resisted by the use of shift rail detents and/or back-tapered jaw clutch teeth as is well known in the prior art. Referring to FIG. 3, the portion of a jaw clutch 40 having jaw clutch teeth 42 engaged with jaw clutch teeth 44 is illustrated. Both of the engaged jaw clutch teeth are provided with circumferentially inwardly tapered side wall, i.e. so-called "back-tapered", surfaces to resist the tendency of the jaw clutches to work apart under the influence of vibrations and the transmission of torque. Such back-tapered jaw clutch teeth are well known in the prior art as may be seen by reference to U.S. Pat. Nos. 3,367,462; 4,013,153 and 4,290,515, the disclosures of which are hereby incorporated by reference.

Figure 1:
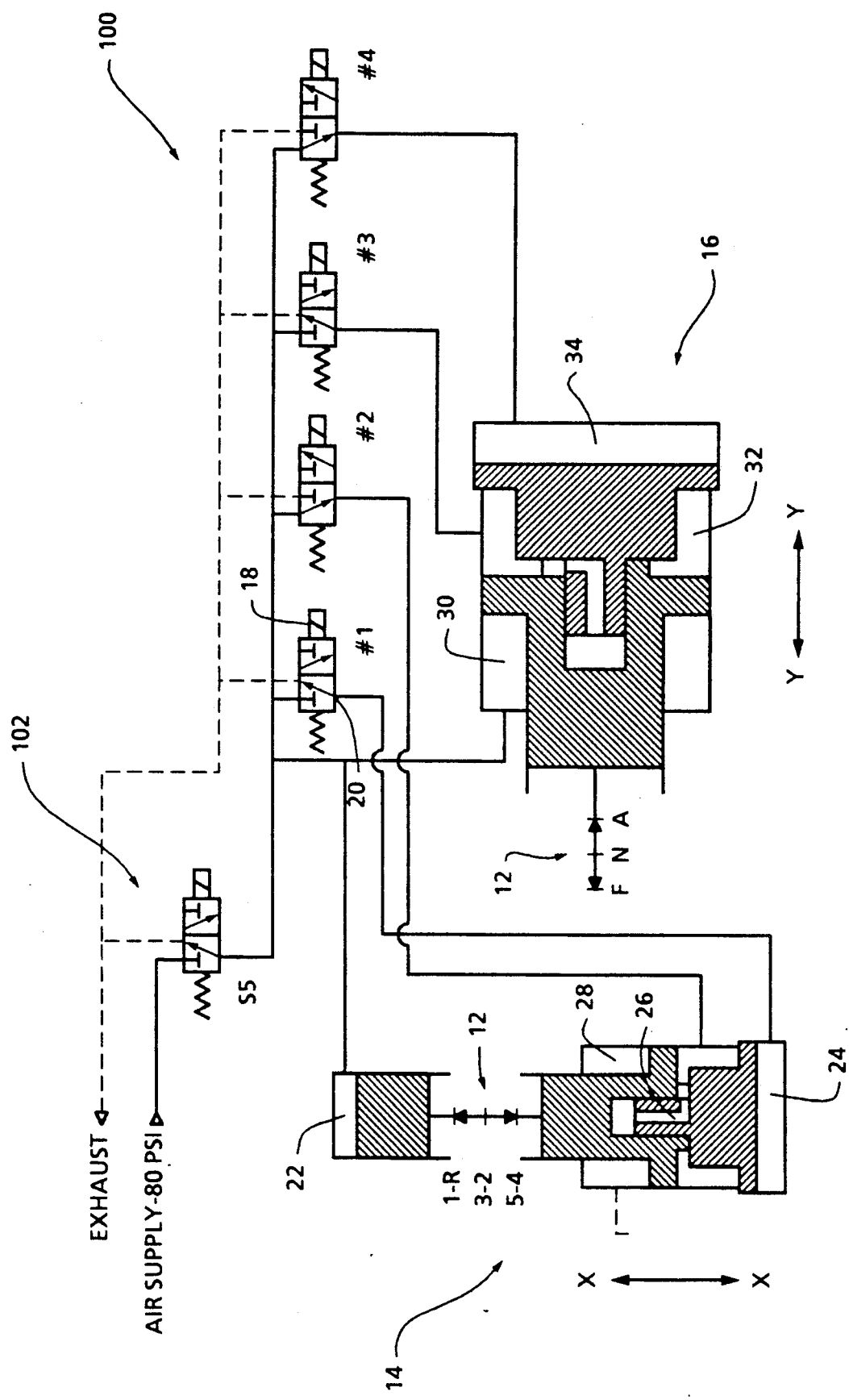
FIG. 1 is a schematic illustration of the shift control system of the present invention.

The electrically controlled, pressurized fluid actuated, transmission control system 100 of the present invention may be seen by reference to FIG. 1. System 100 is structurally and functionally identical to system 10 described above and illustrated in FIG. 4 with the exception of the addition of a fifth normally closed solenoid operated three-way, two-position anti-default valve 102 which is interposed between the source of fluid pressure and the inlet ports of all of the other solenoid controlled valves and the constantly pressurized cylinder chambers 22 and 30. Accordingly, all of the components of system 100 are assigned the same reference numerals as utilized in a description of system 10 above and will not be again described in detail.

The electrical power selectively supplied to the solenoid of anti-default valve 102 is from the same source as the electrical power selectively supplied to the solenoids of the position control valves 1, 2, 3 and 4.

Briefly, the normally closed solenoid operated valve 102, when in its normally closed position, will block the supply of pressurized fluid to all of the chambers of the piston/cylinder assemblies, 14 and 16, and will cause all of said chambers to be vented to atmosphere. If the transmission controlled by the shift control assembly 100 is provided with mechanical means to retain its existing condition, such as back-tapered clutches and/or shift rail detents, the transmission will be retained in its existing engaged ratio.

Preferably, normally closed solenoid operated valve 102 is only energized during a shift transient and is then deenergized upon obtaining and verification of engagement of a desired gear ratio. Alternatively, valve 102 may remain energized so long as the source of electrical power to the control system 102 remains uninterrupted but will, upon interruption of said source of electrical power, be effective to block the supply of pressurized fluid and vent all of the piston/cylinder chambers to prevent the transmission from being unintendedly and unexpectedly shifted to the default position thereof.

It is noted, that even if the default position of the actuator is an engaged ratio position, unintendedly disengaging a currently engaged ratio may result in the transmission system being unable to obtain engagement of the default position ratio.

In view of the above, it may be seen that an improved electrically controlled, fluid pressure actuated control system, preferably an actuator control system for a mechanical transmission, has been provided that will prevent undesired and/or unexpected shifting of the actuator to the default position thereof upon an interruption of the source of electrical power.

Although the present invention has been described in terms of what is presently believed to be the preferred embodiment, it will be apparent to those skilled in the art that various changes may be made without departing from the spirit and the scope of the invention as hereinafter claimed.

We claim:

1. A control medium controlled, fluid pressure actuated control system (100) for controlling the position of a multiple position (F, N, A) piston/cylinder actuator (16), said actuator having at least one selectively pressurized and exhausted chamber (32, 34) controlled by a two-position positioning valve (1, 2, 3, 4) having a normally assumed position wherein said chamber is fluidly connected to one of a source of pressurized fluid or exhaust and a displaced position wherein said chamber is fluidly connected to the other of said exhaust or source of pressurized fluid, said actuator assuming a first default position (N) when all of said position valves are in the normally assumed positions thereof and displaceable from said default position to at least one second position (F, A) upon selective displacement of at least one of said position valves from the normally assumed position thereof, said system characterized by:
a control medium actuated normally closed two position anti-default valve (102) fluidly interposed said source of pressurized fluid and said actuator.

2. The control system of claim 1 wherein said control medium is electrical current and said position and anti-default valves are solenoid controlled valves.

3. The control system of claims 1 or 2 wherein said actuator includes at least one second chamber (30) constantly fluidly connected to the outlet of said anti-default valve regardless of the position of said position control valves.

4. The control system of claim 3 wherein said anti-default valve is displaced from the normally closed position thereof only during shift transient operations.

5. The control system of claim 2 wherein said actuator controls the axial position of a transmission shift rail and said shift rail is provided with detent mechanisms to resiliently retain the shift rail in the desired positions thereof.

6. The control system of claim 3 wherein said actuator controls the axial position of a transmission shift rail and said shift rail is provided with detent mechanisms to resiliently retain the shift rail in the desired positions thereof.

7. The control mechanism of claim 2 wherein said actuator controls the axial engagement and disengagement of positive jaw clutch assemblies and said jaw clutch assemblies are provided with back-tapered jaw clutch teeth.

8. The control mechanism of claim 3 wherein said actuator controls the axial engagement and disengagement of positive jaw clutch assemblies and said jaw clutch assemblies are provided with back-tapered jaw clutch teeth.

* * * * *